March 31, 1925.

J. JOHANSSON 1,531,699

BOLT CONNECTION FOR WOOD (TIMBER) CONSTRUCTIONS

Filed March 28, 1921     3 Sheets-Sheet 1

Inventor
Jac. Johansson
By Marker&Clerk
Attys.

March 31, 1925.
J. JOHANSSON
1,531,699
BOLT CONNECTION FOR WOOD (TIMBER) CONSTRUCTIONS
Filed March 28, 1921.   3 Sheets-Sheet 2
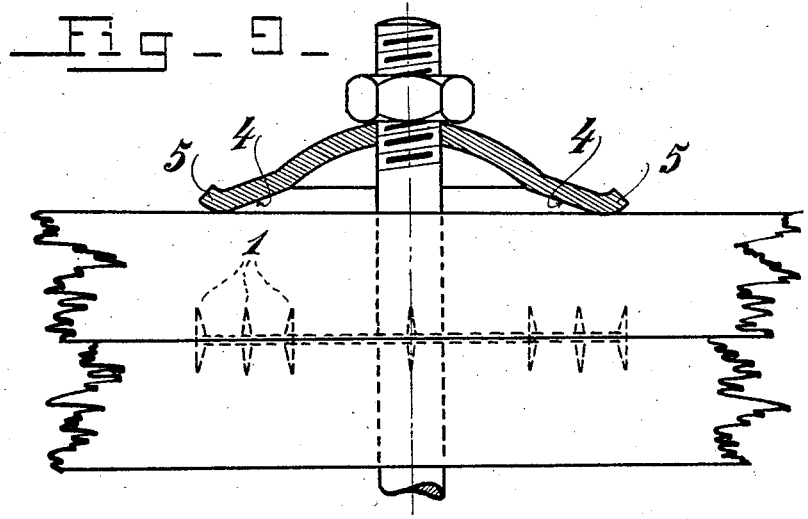
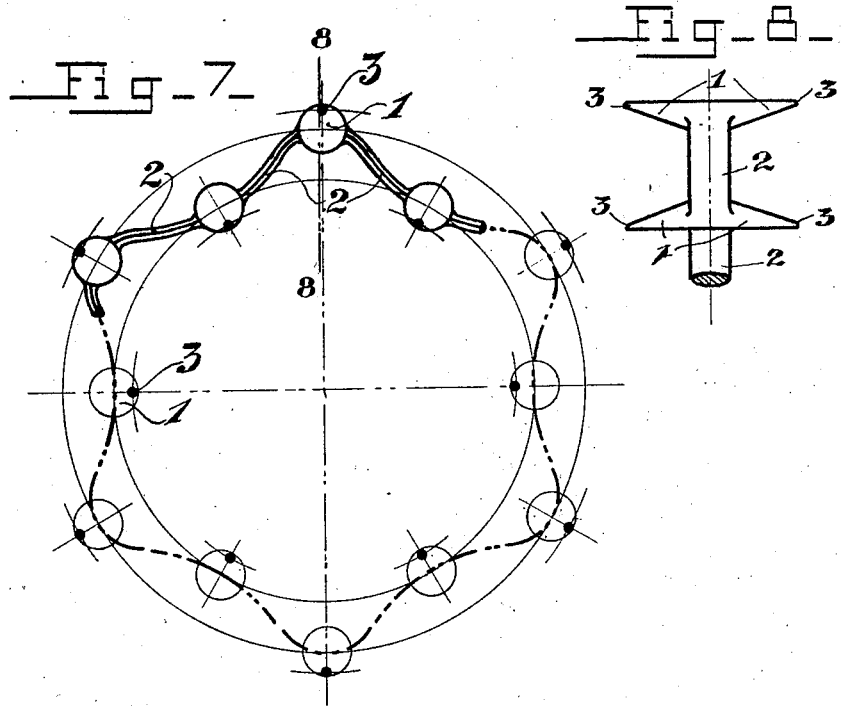
Inventor
Jac. Johansson
By Marks & Clerk
Attys.

March 31, 1925.  1,531,699
J. JOHANSSON
BOLT CONNECTION FOR WOOD (TIMBER) CONSTRUCTIONS
Filed March 28, 1921   3 Sheets-Sheet 3

Inventor
Jac. Johansson
By Marks & Clerk
Attys.

Patented Mar. 31, 1925.

1,531,699

UNITED STATES PATENT OFFICE.

JACOB JOHANSSON, OF CHRISTIANIA, NORWAY.

BOLT CONNECTION FOR WOOD (TIMBER) CONSTRUCTIONS.

Application filed March 28, 1921. Serial No. 456,138.

*To all whom it may concern:*

Be it known that I, JACOB JOHANSSON, citizen of Sweden, residing at Christiania, Norway, have invented certain new and useful Improvements in Bolt Connections for Wood (Timber) Constructions, of which the following is a specification.

This invention relates to an improvement in bolt connections for wood (timber) constructions, where the different wooden parts are connected with each other by means of spiked members or rings in such a way that the usual lap joints and tapped connections are avoided.

The types of "bolt and spike connections" known till now, consisting of pressed plates and wire arrangements, are constructed in such a way that the spikes, ribs or corrugations will weaken the profile of the wood, and they can not be used with the same effect on all sorts of timber- or plank-connections. Furthermore they all are more or less dependent of an exact fitting into the wooden parts, and they are constructed for certain definite systems or connections, which will again limit their use.

The object of this invention is the making of members or rings to be placed between the wooden members, which members or rings are given the form of a lattice work, polygon, star, ring, plate, snake-formed band or the like, and are made of suitable material and fitted with spikes, placed in such a way with respect to each other that only one or at most two of them will lie in the same line of grain in the wood.

Further the invention is characterized by the form of the links connecting the spikes. These links have an elliptic or an angular section, which enables them to readily penetrate into the wood during the contraction of the wooden joint, which will again prevent any displacement of the wooden parts even by the greatest strain.

Again, the spikes have been given such a form that they will not weaken the profile of the wood, and they may be slanting outwards, so that they will cause a tension in the links connecting them.

Several different forms of the invention are shown in the accompanying drawing, in which:

Figure 7 shows the member as a snake-formed ring.

Figure 8 is an elevational view of the upper portion of Fig. 7 looking from the right.

Figure 9 shows a bolt and spike member connection with the spike member in place—before the joint is screwed together.

Figure 1:
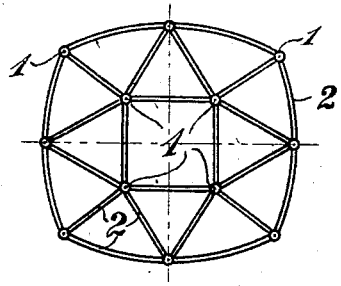
Figure 1 shows a spike member in the form of a lattice work.
Figure 2:
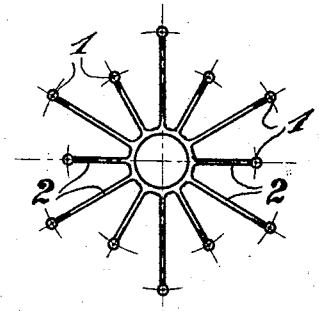
Figures 2, 3 and 4 show the member as a star.
Figure 3:
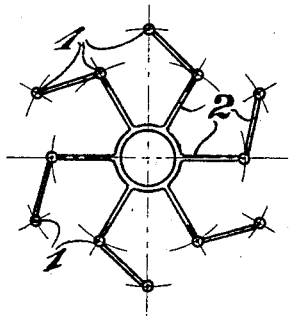
Figure 4:
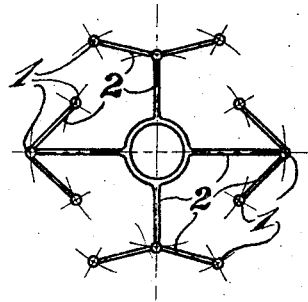
Figure 5:
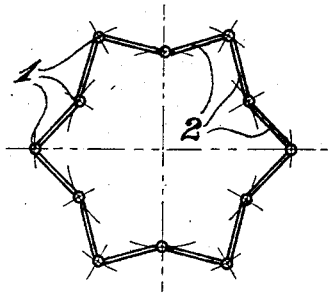
Figure 5 shows the member with a polygon form.
Figure 6:
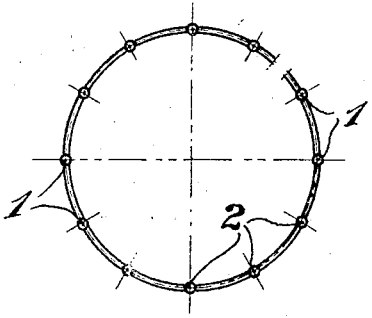
Figure 6 shows the member as an open ring.

The types of spike members shown in the drawing, have at least twelve wedge shaped spikes, connected with each other by links 2, which have an elliptic, T-shaped, or other suitable section. The drawings show that only one or at most two spikes are placed in the same line of grain of the wood. Hereby cracking of the wooden parts by the spikes is avoided.

In Figures 2–8 the spike member is constructed in such a way, that some displacement of the spikes with respect to each other is made possible, whereby spikes striking knots are able to find their way outside of these. Furthermore these spike members will not cause any cracks by a deformation of the wooden parts, as they themselves are able to yield to and follow the deformation.

The spike member is made as an open or closed ring, polygon, star or the like, and is fitted with spikes as mentioned above. The links connecting the spikes are made of a flexible material, such as malleable iron, soft iron or the like, which will permit a displacement of the spikes with respect to each other. As the spikes are placed at the outer periphery of the member, that is far from the bolt hole, every spike will give full effect even in soft wod.

In Figures 7 and 8 the spikes have been given the form of slanting cones or pyramids, whose points 3 are so placed with respect to each other, that the spikes during the driving into the wood will have a tendency to part from each other on account of the outward slanting, thereby causing a tension in the flexible links between them.

Hereby a tight and safe connection is obtained.

Figure 10:
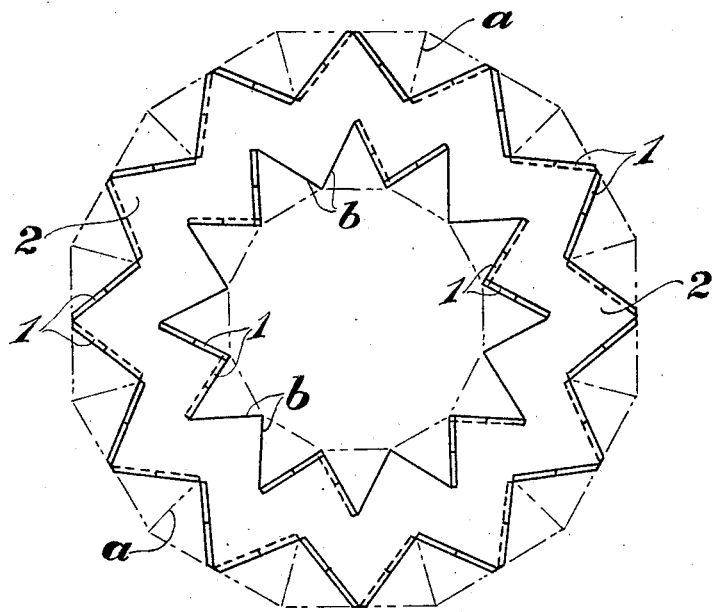
Figure 10 shows the spike member in the form of cut out plate.
Figure 11:
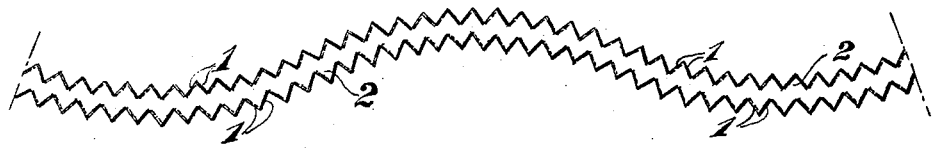
Figure 11 shows the spike member as a snake formed band.

In Figures 10 and 11 the spike member is made from a steel or metal plate or band, in which spikes are cut in such a way, that only one or at most two of them can enter the same line of grain in the wood.

The spike member, shown in Figure 10, is produced by cutting out clips along the lines *a* and *b* in the outer and inner rim of the plate, after which the appearing tongues are bent at right angles alternately to one side or the other. The cuts *a* and *b* are so arranged, that only one or at most two of the bent out tongues will enter the same line of grain in the wood.

In Figure 11 the spike member is produced from a snake formed band, in which cuts are made as in Figure 10. Also by this form only one or at most two laps or spikes will enter the same line of grain in the wood.

This form of spike member is to be used for comparatively small wooden constructions, built up girders, lap joints and the like, and they have the advantage of being independent of changes in the wooden parts due to altering weather conditions; and furthermore this type of spike member on account of its wavy shape will not be subjected to any tension.

Figure 9 shows a washer plate for the "bolt and spike member connection" described above.

The washer plate is characterized chiefly by its curved shape, and by its being fitted with bearing surfaces along the outer rim of the bottom side, said bearing surfaces having a straight lined, curved or wavy section.

The washer plate shown is so constructed that the inner and outer diameter of its bearing surface 4 corresponds to the smallest and largest diameter of the curved lines along which the spikes are placed. The bearing surface 4 may be plane or wavy or have an other suitable form of section, and may have rounded corners as shown in the drawing, so that these do not crush the wood when the bolt is tightened.

In this way an elastic washer plate is obtained, which will not penetrate into or damage the fibres of the wooden parts if these expand for some reason, for instance by lasting wet weather, because the area of the bearing surface will increase with increasing pressure.

Having now described my invention, what I claim as new and desire to secure by Letters Patent is:—

1. A spike member connection for superposed wood planks provided with upwardly and downwardly extending spikes so arranged that a straight line drawn through the member may intersect only two of said upwardly extending spikes or two of said downwardly extending spikes, and flexible links connecting said spikes.

2. A spike member including upwardly and downwardly extending spikes and links connecting the spikes, said links being so shaped that they will easily penetrate into the wood during the contraction of the joint, whereby the connection is strengthened.

3. A spike member including upwardly and downwardly extending spikes and flexible links connecting said spikes, said links being so constructed that they will permit a displacement of the spikes with respect to each other, said links being so shaped that they will readily penetrate into the wood during the contraction of the joint, whereby the connection is strengthened.

4. A spike member including upwardly and downwardly extending spikes and flexible links connecting said spikes, said spikes having points placed in such manner, that, during the driving of the spikes into the wood, they will cause a tension in the links connecting them, said links being so shaped that they will easily penetrate into the wood during the contraction of the joint, and the spikes being so arranged that a straight line drawn through the member may intersect only two of said upwardly extending spikes or two of said downwardly extending spikes.

5. A spike member comprising a series of flexible links having such shape in cross section as to facilitate the entrance of the links into the wood to be connected by the spike member, and spikes connected to said links and projecting in opposite directions, said spikes being so arranged that a straight line drawn through the member may intersect only two of said spikes, and the points of said spikes being off set so as to cause a tension in the links connecting the spikes when the spikes are driven into the wood.

In testimony whereof I have affixed my signature in presence of two witnesses.

JACOB JOHANSSON.

Witnesses:
 T. PHALLING,
 ULRIC OTTERBECK.